United States Patent
Kikukawa et al.

(10) Patent No.: US 7,787,334 B2
(45) Date of Patent: Aug. 31, 2010

(54) OPTICAL RECORDING METHOD ON MULTILAYER OPTICAL RECORDING MEDIUM, OPTICAL RECORDING APPARATUS, AND MULTILAYER OPTICAL RECORDING MEDIUM

(75) Inventors: Takashi Kikukawa, Tokyo (JP); Koji Mishima, Tokyo (JP); Tsutomu Aoyama, Tokyo (JP); Hidetake Itoh, Tokyo (JP)

(73) Assignee: TDK Corporation, Tokyo (JP)

( * ) Notice: Subject to any disclaimer, the term of this patent is extended or adjusted under 35 U.S.C. 154(b) by 468 days.

(21) Appl. No.: 11/998,549

(22) Filed: Nov. 30, 2007

(65) Prior Publication Data
US 2008/0130444 A1 Jun. 5, 2008

(30) Foreign Application Priority Data
Nov. 30, 2006 (JP) .............................. 2006-324186

(51) Int. Cl.
G11B 7/00 (2006.01)
(52) U.S. Cl. .................... 369/44.33; 369/94; 369/53.15
(58) Field of Classification Search ........................ None
See application file for complete search history.

(56) References Cited

U.S. PATENT DOCUMENTS 7,663,992 B2 * 2/2010 Ito et al. .................. 369/47.14

2003/0137910 A1 * 7/2003 Ueda et al. ................ 369/47.14
2006/0268670 A1 11/2006 Kimura et al.
2008/0175124 A1 * 7/2008 Kikukawa et al. ............. 369/94

FOREIGN PATENT DOCUMENTS

| JP | 2001014808 | | 1/2001 |
|---|---|---|---|
| JP | 2005050543 | A | 2/2005 |
| JP | 2006500713 | A | 1/2006 |
| JP | 2006244658 | A | 9/2006 |
| JP | 2007012248 | A | 1/2007 |
| WO | 2004029964 | A1 | 4/2004 |

* cited by examiner

Primary Examiner—Joseph Haley
(74) Attorney, Agent, or Firm—Porzio, Bromberg & Newman, P.C.

(57) ABSTRACT

When there is a defect area in a specific recording layer, recording of information is continued and reduction in a recording rate is restrained. In an optical recording method for recording information on a multilayer optical recording medium having a plurality of recording layers by irradiating the recording layer with a beam spot, any recording layer is set as an escape recording layer. When a defect area is detected while information is recorded on another recording layer except for the escape recording layer, the beam spot moves to the escape recording layer to continue recording the information.

19 Claims, 5 Drawing Sheets

OPTICAL RECORDING METHOD ON MULTILAYER OPTICAL RECORDING MEDIUM, OPTICAL RECORDING APPARATUS, AND MULTILAYER OPTICAL RECORDING MEDIUM

BACKGROUND OF THE INVENTION

1. Field of the Invention

The present invention relates to an optical recording method on a multilayer optical recording medium having a plurality of recording layers, an optical recording apparatus adopting the recording method, and a multilayer optical recording medium.

2. Description of the Related Art

When information is recorded by irradiating a recording layer of an optical recording medium with a beam spot of a laser or the like, various factors can cause a recording error. Some of the factors that can cause a recording error include the meandering of a recording track on the optical recording medium, bumps and dips in the recording track, air bubbles in a spacer layer, and the like. Other factors causing a recording error may also include foreign matter such as a fingerprint, dust, and the like adhering to the surface of the optical recording medium.

In order to appropriately avoid a defect area in which any such factor exists, a recording technology has been developed which checks for a defect prior to the recording of data. For example, there is a method for detecting a defect (dropout) which utilizes the reflected light of the beam spot when recording information. Use of the reflected light of the beam spot when recording can allow for the detection of a tracking error, a focus error, and the like, so that any defect in the recording layer can be determined by the extent of these errors. When it is determined that a dropout has occurred, an optical pickup is shifted in a radial direction in order to avoid the recording track that has the defect and information is then recorded on a different recording track. Using an alternative area like this makes it possible to avoid the defect area. In order to detect the defect area, an inspection method that irradiates the recording track with a beam spot before recording is used. When information is recorded on the alternative area, being a different recording track, thereby avoiding the defect area, translation table information which contrasts the sector address of the defect area with the sector address of the alternative area is recorded on a defect management area provided at the innermost or outermost circumference of the optical recording medium. When the information is reproduced the next time, reference to the defect management area in order to obtain a translation table makes it possible to smoothly reproduce the information.

In recent years, a multilayer optical recording medium having a plurality of recording layers has been proposed as the preferred optical recording medium. A specific recording layer is irradiated with a beam spot by controlling the focus of a laser beam, so that information is recorded on each recording layer. Presently, if a defect area exists in each recording layer, the beam spot moves in a radial direction and records information on a different recording track in the same recording layer. A defect management area is formed at the inner or outer circumference of each recording layer. When the operation to avoid the defect area (hereinafter referred to as the escape operation) is carried out, a translation table and the like are recorded on the defect management area of that recording layer.

In this kind of multilayer optical recording medium, since the defect management area can be allocated in each recording layer, it is proposed that the translation table of the specific recording layer is concurrently recorded on the defect management area of another recording layer in order to duplicate the translation table (see Japanese Patent Application Laid-Open No. 2001-014808).

In the multilayer optical recording medium, when the defect management area is secured in the innermost or outermost circumference of each recording layer, all defect management areas are overlapped in the data stacking direction. Thus, when the innermost or outermost circumference is scratched, all the defect management areas become unavailable at the same time. In order to resolve this problem, a method for dispersively disposing the defect management areas so as not to overlap in the data stacking direction among a plurality of recording layers in a multilayer optical recording medium has been proposed (Japanese Patent Application Laid-Open No. 2006-500713).

In both Japanese Patent Application Laid-Open Nos. 2001-014808 and 2006-500713, however, in order to avoid the defect area, it is necessary to shift the optical pickup in the recording layer in the radial direction. Thus, in the case of a recording method in which the number of revolutions of a motor varies in accordance with the radial position of the optical pickup, like zone CLV, there is a problem in that control over the number of revolutions of the optical recording medium takes time and hence the recording rate is reduced during the escape operation.

The radial shift distance of the optical pickup in the escape operation is set to be sufficiently large so as to ensure escape from the defect area. As a result of this, there is a problem in that the storage capacity of the recording layer in which the defect area is detected is reduced. It is conceivable that information is separately recorded on an allowance sector between the defect area and an escape area. In such a case, however, there is a problem in that readout efficiency is reduced because the information is recorded on radially dispersive recording areas in fragments.

Furthermore, when the shift mechanism of the optical pickup used in the conventional recording method is broken and the optical pickup cannot be shifted in the radial direction, there is a problem in that it is impossible to safely end the information recording operation because the escape operation cannot be carried out.

At present, conventional optical recording media have the problem of being unable to achieve nominal storage capacity if a defect area occurs. In particular, if the entire storage capacity is increased due to a multilayer structure, the capacity is extensively varied in accordance with the rate of defect areas, so that there is conceivably a case where a user expecting the nominal storage capacity printed on a package will find it to not actually be achievable.

SUMMARY OF THE INVENTION

In view of the foregoing problems, it is an object of the present invention that when a defect area occurs in a recording layer of a multilayer optical recording medium, an escape operation is safely and quickly carried out in order to restrain any reduction in a recording rate and storage capacity.

The foregoing object is achieved by the following means which the inventors have determined by diligent study.

A first aspect of the present invention is an optical recording method for recording information on a multilayer optical recording medium having a plurality of recording layers by irradiating the recording layer with a beam spot, wherein any recording layer is set as an escape recording layer. When a defect area is detected while information is being recorded on another recording layer except for the escape recording layer, the beam spot moves to the escape recording layer in order to continue recording the information.

In this optical recording method according to the first aspect of the present invention, wherein the recording layer which is the second farthest from a light incident surface of the multilayer optical recording medium is set as the escape recording layer.

In this optical recording method according to the first aspect of the present invention, wherein a recording density of the escape recording layer is set lower than at least one of other recording layers.

In this optical recording method according to the first aspect of the present invention, wherein the multilayer optical recording medium has four or more recording layers.

In this optical recording method according to the first aspect of the present invention, wherein after a predetermined amount of information is recorded on the escape recording layer, the beam spot is allowed to return to the recording layer being recorded on before escape and to continue recording information.

In this optical recording method according to the first aspect of the present invention, wherein the recording layer which is the nearest to a light incident surface of the multilayer optical recording medium is set as the escape recording layer.

A second aspect of the present invention is an optical recording apparatus for recording information on a multilayer optical recording medium having a plurality of recording layers by irradiating the recording layer with a beam spot, the optical recording apparatus including: a recording layer setting section for setting any recording layer as an escape recording layer; a recording section for recording information by irradiating another recording layer except for the escape recording layer with the beam spot; an inspecting section for detecting a defect area of the recording layer using reflected light of the beam spot; and an escape processing section for changing the focus of the beam spot to the escape recording layer when the defect area is detected by the inspecting section.

A third aspect of the present invention is a multilayer optical recording medium comprising: a general-purpose recording layer which allows for the information recording operation, including a recording starting process, by irradiating the general-purpose recording layer with a beam spot; and an escape recording layer which allows recording of information to be recorded on a defect area when the defect area is detected in the general-purpose recording layer during the recording operation.

According to the information recording method and the like of the present invention, when a defect area is detected in a recording layer of a multilayer optical recording medium, an escape operation can be carried out quickly and hence it is possible to restrain any reduction in the recording rate and storage capacity.

BRIEF DESCRIPTION OF THE DRAWINGS

The above and other objects, features and advantages of the present invention will become apparent from the following description and appended claims, taken in conjunction with the accompanying drawings.

DETAILED DESCRIPTION OF THE PREFERRED EMBODIMENTS

Embodiments of the present invention will be described in detail with reference to the accompanying drawings.

Figure 1:
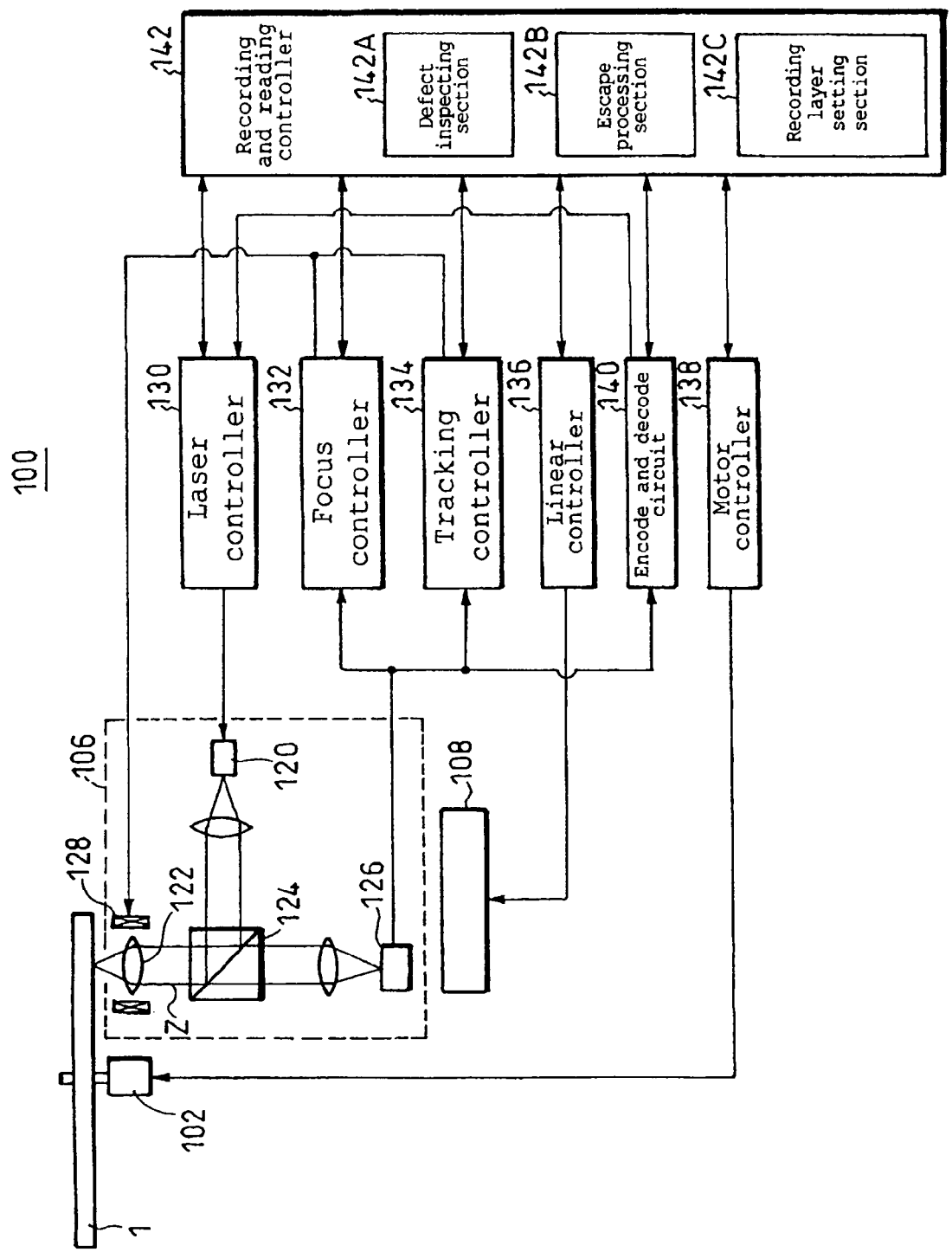
FIG. 1 is a block diagram showing an example of the structure of a recording and reproducing apparatus according to embodiments of the present invention.

FIG. 1 shows a recording and reproducing apparatus 100 which illustrates an optical recording method according to various embodiments of the present invention. The recording and reproducing apparatus 100 is provided with a motor 102, an optical pickup 106, and a linear drive mechanism 108. The motor 102 rotates an optical recording medium 1. The optical pickup 106 irradiates the optical recording medium 1 with a beam spot to record and reproduce information. The linear drive mechanism 108 linearly drives the optical pickup 106 in a radial direction of the optical recording medium 1. The optical recording medium 1 is a multilayer optical recording medium which has a plurality of recording layers for recording information on.

The optical pickup 106 is provided with a laser light source 120, an objective lens 122, a half mirror 124, a photo-detection device 126, and a lens drive coil 128. The optical pickup 106 can adjust the focus of the laser light Z on the recording layer of the optical recording medium 1.

The laser light source 120 is a semiconductor laser which generates the laser light Z for both recording and reading. The objective lens 122 forms the minute beam spot by narrowing the focus of the laser light Z and irradiates the specific recording layer with it. The half mirror 124 takes out reflected light from the recording layer and directs it to the photo-detection device 126. The photo-detection device 126, being a photo-detector, receives the reflected light of the laser light Z and converts it into an electrical signal. The lens drive coil 128 shifts the objective lens 122 to the direction of the optical axis and to a tracking direction.

Furthermore, the recording and reproducing apparatus 100 is provided with a laser controller 130, a focus controller 132, a tracking controller 134, a linear controller 136, a motor controller 138, an encode and decode circuit 140, and a recording and reading controller 142. The laser controller 130 controls the driving of the laser light source 120 of the optical pickup 106 on the basis of directions received from the encode and decode circuit 140 and the recording and reading controller 142. The focus controller 132 detects a focus error based on the electrical signal sent from the photo-detection device 126 and controls the drive of the lens drive coil 128 in a focus direction (being the direction of the optical axis) with the use of the focus error. The focus controller 132 also has the function of transmitting focus error information to the recording and reading controller 142. The tracking controller 134 detects a tracking error on the basis of the electrical signal sent from the photo-detection device 126 and controls the drive of the lens drive coil 128 in the tracking direction with the use of the tracking error. The tracking controller 134 also has the function of transmitting tracking error information to the recording and reading controller 142 and to the linear controller 136. Accordingly, it is possible to make the beam spot follow a recording track using the tracking control of the lens drive coil 128 and the linear drive of the whole optical pickup 106 using the linear controller 136. The linear controller 136 controls the drive of the linear drive mechanism 108 which is composed of a linear motor and the like, and slides the optical pickup 106 in the radial direction of the optical recording medium 1. The motor controller 138 controlling the rotational speed of the motor 102 rotates the optical recording medium 1 using the zone CLV method in this instance. A CLV method is a recording method by which the optical pickup 106 moves with constant linear velocity on the optical recording medium 1, in other words, the number of revolutions per minute is gradually reduced from the inner circumference to the outer circumference of the optical recording medium 1. In addition to this, the zone CLV divides the recording layer of the optical recording medium 1 into several areas (zones) from the inner circumference outwards and information is recorded by the CLV method on a zone-by-zone basis.

The encode and decode circuit 140 has an encode function and a decode function. As the decode function, the encode and decode circuit 140 decodes the electrical signal sent from the photo-detection device 126 into a digital signal and transmits the digital signal to the recording and reading controller 142. As the encode function, the encode and decode circuit 140 subjects a digital signal for recording sent from the recording and reading controller 142 to a pulse modulation and transmits an electrical signal after modulation to the laser controller 130. The recording and reading controller 142 for integrally controlling the entire control device controls various kinds of controllers, drivers, and the like by using a CPU and a buffer memory, which are not especially illustrated, and also carries out the input and output of recording and reading information to a host computer. To be more specific, the recording and reading controller 142 is provided with a defect inspecting section 142A, an escape processing section 142B, and a recording layer setting section 142C. The recording layer setting section 142C sets an escape recording layer among a plurality of recording layers of the optical recording medium 1. The other recording layers except for the escape recording layer are for general-purpose recording. The defect inspecting section 142A detects a defect area (dropout area) of the optical recording medium 1 with the use of a focus error signal and a tracking error signal detected by the focus controller 132 and the tracking controller 134. When the defect inspecting section 142A detects the defect area, the escape processing section 142B directs the focus controller 132 to shift focus so that the focus of the beam spot is shifted to the escape recording layer in order to continue recording.

In the recording and reproducing apparatus 100, the wavelength λ of the laser light Z is set to a value in the range of 400 to 410 nm and the initial reproducing power of the laser light Z is set to a value in the range of 0.3 to 2.0 mW. The numerical aperture NA of the objective lens 122 in the optical pickup 106 is set to a value in the range of 0.70 to 0.90. Accordingly, the spot diameter (λ/NA) of the laser light Z is set to a value in the range of 444 nm to 586 nm.

In order to record information on the optical recording medium 1, the laser light Z is generated from the laser light source 120 by the recording power and the specific recording layer of the optical recording medium 1 is irradiated with the beam spot. In order to reproduce the information, on the other hand, the laser light Z is generated from the laser light source 120 by the reading power and the recording layer of the optical recording medium 1 is irradiated with the laser light Z.

In the case of both recording and reading, the laser light Z which is reflected from the recording layer and is taken out through the optical pickup 106 becomes an electrical signal in the photo-detection device 126. The electrical signal becomes a digital signal by passing through the encode and decode circuit 140.

Figure 2A:
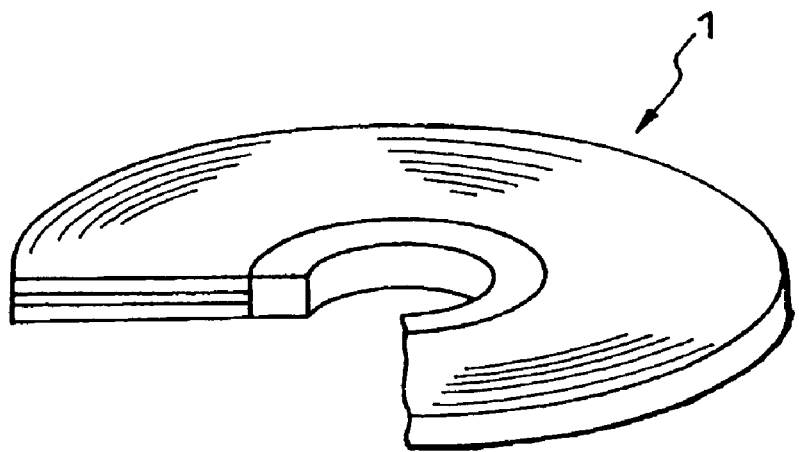
FIG. 2A is a perspective view and FIG. 2B is an enlarged sectional view showing an optical recording medium used in the embodiments of the present invention.
Figure 2B:
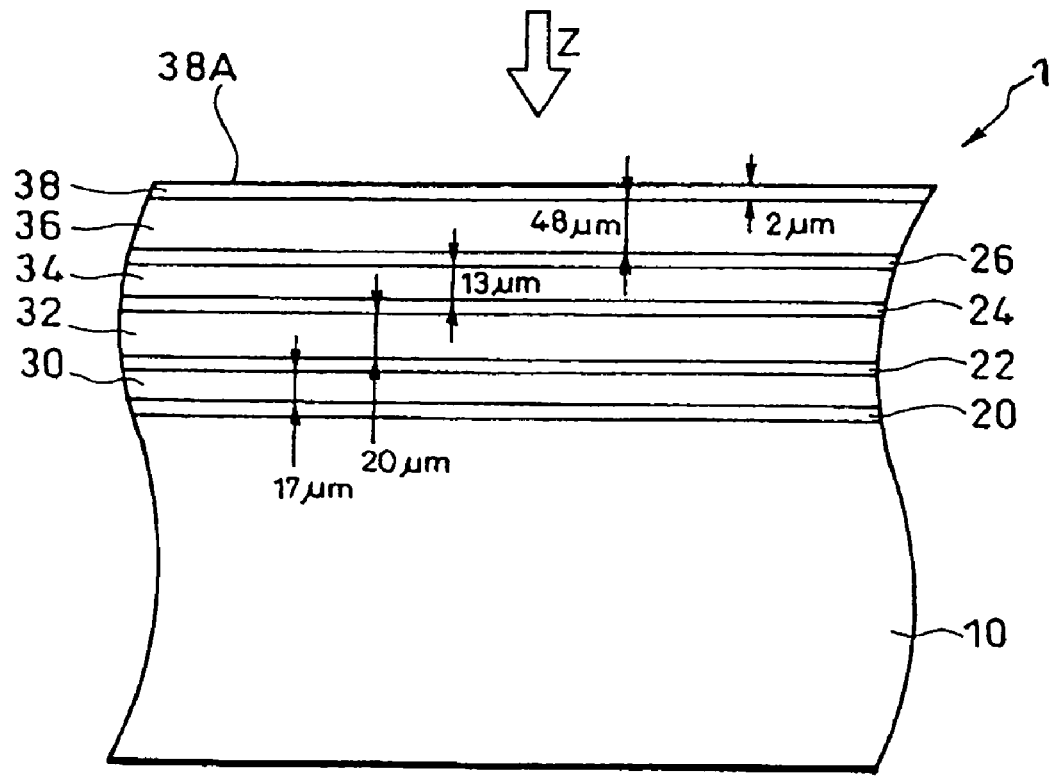

The optical recording medium 1 used for the reproduction of the recording and reproducing apparatus 100 will now be described. First, with reference to FIG. 2A, the optical recording medium 1 is a disc shaped with a diameter of approximately 120 mm and a thickness of approximately 1.2 mm. As shown in FIG. 2B by enlargement, the optical recording medium 1, being the multilayer medium with four recording layers, is composed of a substrate 10, an L0 recording layer 20, a first spacer layer 30, an L1 recording layer 22, a second spacer layer 32, an L2 recording layer 24, a third spacer layer 34, an L3 recording layer 26, a cover layer 36, and a hard coat layer 38 which are deposited in this order.

All of the first to third spacer layers 30, 32, and 34, the cover layer 36, and the hard coat layer 38 have optical transparency and incident laser light from the outside passes therethrough. As a result, using the laser light Z incident from a light incident surface 38A of the hard coat layer 38 makes it possible to record and reproduce information on and from all of the L0 to L3 recording layers 20, 22, 24, and 26.

The L0 recording layer 20 is the farthest from the light incident surface 38A and the L3 recording layer 26 is the nearest to the light incident surface 38A. The L1 recording layer 22 is the second farthest from the light incident surface 38A and the L2 recording layer 24 is the second nearest to the light incident surface 38A. The L1 recording layer 22 is set to be the escape recording layer and the remaining L0, L2, and L3 recording layers 20, 24, and 26 are set to be the general-purpose recording layers. On the general-purpose recording layers, the operation for recording of information, including a trial process for starting recording, is carried out by the irradiation of the beam spot of the laser light Z-When a defect area is detected during the recording operation on the general-purpose recording layers, information to be recorded on the defect area is recorded on the escape recording layer instead of on the recording layers for general purpose.

The recording density of the L1 recording layer 22 being the escape recording layer is set lower than those of the L0, L2, and L3 recording layers 20, 24, and 26 which serve as a general-purpose recording layer. The storage capacity of the L1 recording layer 22 is set at 23.3 GS here, and the storage capacity of the L0, L2, and L3 recording layers 20, 24, and 26 is set at 25 GB each. Thus, the nominal storage capacity of the optical recording medium 1 is 75 GB, being the total of the general-purpose recording layers. Information for distinguishing the general-purpose recording layers from the escape recording layer, the recording density of each recording layer, and the like is stored in advance on a burst cutting area (BCA) or on a read-in area of the optical recording medium 1.

When information is recorded/reproduced on/from the L0 recording layer 20, the L0 recording layer 20 is irradiated with the laser light Z through the L1 to L3 recording layers 22, 24, and 26. In a similar manner, when information is recorded/reproduced on/from the L1 recording layer 22 being the escape recording layer, the L1 recording layer 22 is irradiated with the laser light Z through the L2 and L3 recording layers 24 and 26. When information is recorded/reproduced on/from the L2 recording layer 24, the L2 recording layer 24 is irradiated with the laser light Z through the L2 recording layer 24. When information is recorded/reproduced on/from the L3 recording layer 26, the L3 recording layer 26 is directly irradiated with the laser light Z without passing through the other recording layers.

The substrate 10 is a disc-shaped member with a thickness of approximately 1.1 mm. The material of the substrate 10 may be made of various materials such as, for example, glass, ceramic, and resin. A polycarbonate resin is used in this instance. The resin may also be an olefin resin, an acrylic resin, an epoxy resin, a polystyrene resin, a polyethylene resin, a polypropylene resin, a silicon resin, a fluorine resin, an ABS resin, an urethane resin, or the like in addition to the polycarbonate resin. Of the resins described above, the polycarbonate resin and the olefin resin are preferable due to the fact that they are easily processed and molded. In the surface of the substrate 10 on the side on which the recording layer is located, a groove, a land, a pit row, and the like are formed in accordance with the desired application of the optical recording medium.

The first to third spacer layers 30, 32, and 34 which are deposited between the L0 to L3 recording layers 20, 22, 24, and 26 have the function of separating each of the recording layers 20, 22, 24, and 26. A groove (land), a pit row, and the like are formed in the surface of each of the spacer layers 30, 32, and 34 on the light incident surface 38A side. Various materials are available to form the first to third spacer layers 30, 32, and 34 but, as described above, it is necessary to use a material with optical transparency in order to allow the laser light Z to pass there through. It is also preferable to use, for example, an UV-curable acrylic resin.

In the optical recording medium 1, the thickness of the first spacer layer 30 is set at 17 μm, the thickness of the second spacer layer 32 is set at 20 μm, and the thickness of the third spacer layer 34 is set at 13 μm. Varying the thicknesses of the spacer layers 30, 32, and 34 from one another, as described above, makes it possible to reduce the interference of a reading signal and hence reduce noise in a readout signal. The thickness of the hard coat layer 38 is set at 2 μm and the thickness of the cover layer 36 is set at 48 μm.

Accordingly, in the optical recording medium 1, the distance from the light incident surface 38A to the L3 recording layer 26 is approximately 50 μm, the distance from the light incident surface 38A to the L2 recording layer 24 is approximately 63 μm, the distance from the light incident surface 38A to the L1 recording layer 22 is approximately 83 μm, and the distance from the light incident surface 38A to the L0 recording layer 20 is approximately 100 μm. The L0 recording layer 20, including its storage capacity (25 GB), is compliant with the Blu-ray Disc standard.

The data holding form of the L0 to L3 recording layers 20, 22, 24, and 26 is the so-called recording type in which writing by a user is possible. The recording type, to be more specific, is divided into a write-once read-many type in which, if data has been written once in an area, new data is not rewritable in that area and a rewritable type in which, even if data has been written in an area, the data is erased and new data is rewritable. The data holding form of the L0 to L3 recoding layers 20, 22, 24, and 26 can be of either type. It should be noted, however, that the data holding forms of the recording layers 20, 22, 24, and 26 may also be different from one another.

Figure 3:
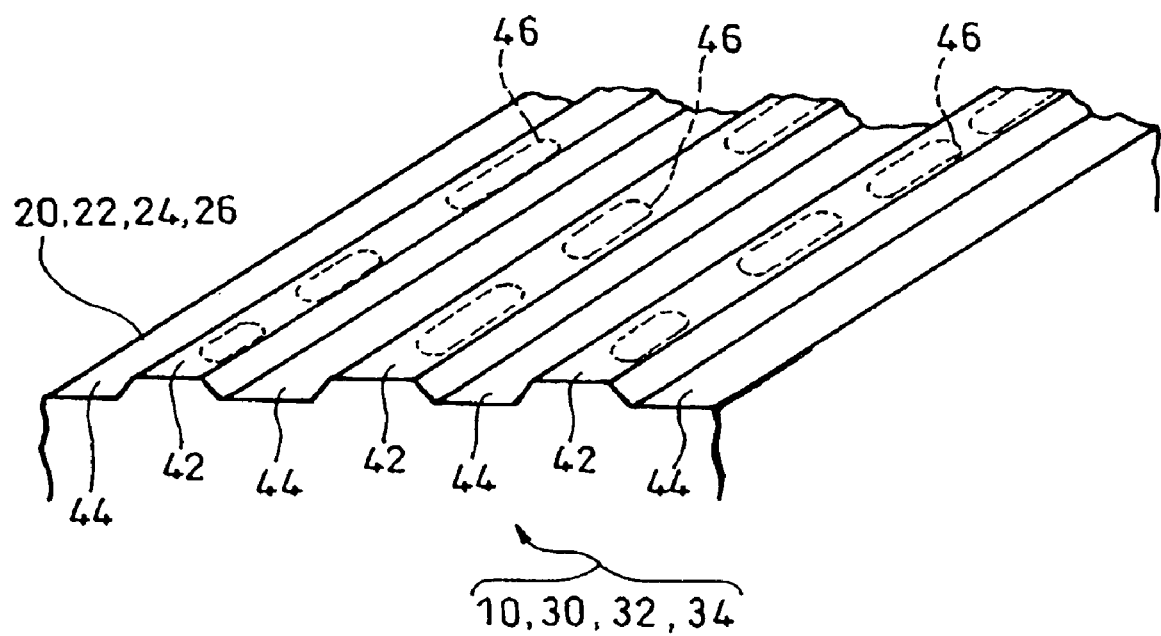
FIG. 3 is an enlarged perspective view showing a data holding form in a recording layer of the optical recording medium.

As shown in FIG. 3, a spiral groove 42 (land 44) formed in the surfaces of the substrate 10 and the first to third spacer layers 30, 32, and 34 becomes a recording track for each of the recording layers 20, 22, 24, and 26. The spiral direction of the groove 42 is the same in the L0 recording layer 20 and the L2 recording layer 24, and the spiral direction of the groove 42 of the L1 recording layer 22 and the L3 recording layer 26 is opposite to that of the L0 recording layer 20 and the L2 recording layer 24. In other words, in the L0 to L3 recording layers 20, 22, 24, and 26, the spiral direction is set to differ from that of the adjacent recording layer. As a result, for example, the final sector of the L0 recording layer 20 and the first sector of the L1 recording layer 22, being adjacent to the L0 recording layer 20, can be disposed in common on one of the innermost and outermost circumferences. The final sector of the L1 recording layer 22 and the first sector of the L2 recording layer 24 can be disposed in common on one of the innermost and outermost circumferences. As a result of this, in the L0 to L2 recording layers 20, 22, and 24 being the general-purpose recording layers, even when information is continuously recorded/reproduced on/from the two recording layers, it is possible to minimize the shift of the optical pickup 106 in the radial direction.

A recording film is formed on each of the L0 to L3 recording layers 20, 22, 24, and 26 and a recording mark 46 can be formed in the recording film by the energy of the laser light Z. The groove 42 acts as a guide track for the laser light Z during recording data. By modulating the intensity of the energy of the laser light Z proceeding along the groove 42, the recording marks 46 are formed in the recording layers 20, 22, 24, and 26 on the groove 42. In the case of the write-once read-many type of data holding form, the recording marks 46 are irreversibly formed and cannot be erased. In the case of the rewritable type of data holding form, however, the recording marks 46 are reversibly formed and can be erased and formed again. The recording film also has to have both optical transparency and light reflectivity. The recording marks 46 are formed in the groove 42 in this instance, but may be formed in the land 44. Otherwise, the recording marks 46 may be formed in both of the groove 42 and the land 44.

When there is a plurality of recording layers 20, 22, 24, and 26, as described above, it is necessary to increase the optical transparency of the recording layers 22, 24, and 26 in order to make the laser light Z, provided it has sufficient intensity, reach the L0 recording layer 20 which is the farthest from the light incident surface 38A. For example, it is preferable to set the optical transparency of the L3 recording layer 26 which is the nearest to the light incident surface 38A at approximately 80. Since the intensity of the laser light Z is reduced by passing through the L1, L2, and L3 recording layers 22, 24, and 26, the light reflectivity of only the L0 recording layer 20 is increased in order to obtain an enough reproduction characteristic with the weak laser light Z. The L1 recording layer 22 is required to have a enough optical transparency with the weak laser light Z. Furthermore, the L1 recording layer 22 is vulnerable to interference by reflected light from the L0 recording layer 20, so that the reproduction characteristic of a signal is apt to become worse.

A method for recording information on the optical recording medium 1 by the recording and reproducing apparatus 100 will now be described.

When recording information is inputted from the host computer to the recording and reading controller 142, the laser controller 130, the focus controller 132, the tracking controller 134, the linear controller 136, the motor controller 138, and the like are controlled in order to start recording. By rotating the optical recording medium 1, the BCA area or the read-in area of the optical recording medium 1 is read out. The recording layer setting section 142C distinguishes the general-purpose recording layer from the escape recording layer on the basis of the information stored on the BCA area or the like and also sets the recording density of each recording layer. Information such as the fact that the L0, L2, and L3 recording layers 20, 24, and 26 are the general-purpose recording layers and the L1 recording layer 22 which is the second farthest from the light incident surface 38A is the escape recording layer is stored on the BCA area of the optical recording medium 1 in this instance, so that the recoding layer setting section 142C sets the type and recoding density of the recording layers based on this information. In the present embodiment, the general-purpose recording layers and the escape recording layer were set on the basis of the information stored on the optical recording medium 1, however the recording layer setting section 142C might set these by itself without using such information.

When the L0 recording layer 20 is selected as the general-purpose recording layer at which the recording of information is started, a recording trial operation is carried out on the L0 recording layer 20. Also, after the completion of the trial, the optical pickup 106 is positioned in a target recording track at which recording is started and preparation for the recording is completed.

Figure 4A:
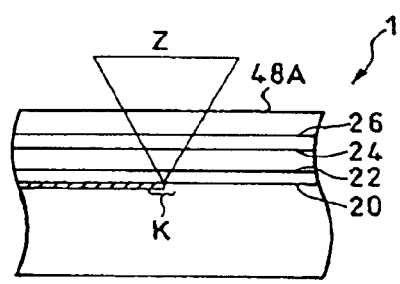
FIGS. 4A to 4F are sectional views showing the information recording states of each recording layer of the optical recording medium.

The encode and decode circuit 140 encodes the recording information provided by the host computer into a pulse signal and inputs it to the laser controller 130. As a result of this, the laser light source 120 set at a particular recording power emits the predetermined laser light Z by pulse irradiation and, as shown in FIG. 4A, its beam spot is incident upon the L0 recording layer 20 in order to record the information. Since the groove 42 is spirally formed in the L0 recording layer 20 in such a manner as to run out from the inside to the outside in the radial direction, the optical pickup 106 shifts to the outside in the radial direction with the progress of the recording.

During the recording operation, the reflected light of the laser light Z is converted into an electrical signal by the photo-detection device 126 through the half mirror 124. With reference to the electrical signal, the focus controller 132, the tracking controller 134, and the linear controller 136 control the optical pickup 106 and the linear drive mechanism 108 whenever necessary. For example, the focus controller 132 detects the focus error. When the focus of the beam spot deviates from the L0 recording layer 20, the focus controller 132 controls the lens drive coil 128 so that the objective lens 122 is shifted in the direction of the optical axis in order to achieve focus. The tracking controller 134 detects the tracking error, that is, whether or not the beam spot correctly follows the groove 42. When the beam spot deviates from the groove 42, the tracking controller 134 shifts the lens drive coil 128 and also shifts the entire optical pickup 106 via the linear controller 136 to make the beam spot follow the groove 42. Therefore, it becomes possible to correctly record the information on the groove 42.

Figure 4B:
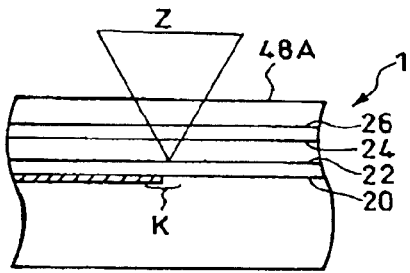

The defect inspecting section 142A of the recording and reading controller 142 judges whether or not the recording track of the L0 recording layer 20 includes a defect area on the basis of information such as the foregoing focus error and tracking error. In this instance, when the focus error or the tracking error exceeds a predetermined permitted value or the accumulation of the errors exceeds a predetermined permitted amount, the defect inspecting section 142A judges the recording track or the sector to be a defect area K. When the defect inspecting section 142A detects the defect area K, the escape processing section 142B drives the lens drive coil 128 through the focus controller 132 so that the objective lens 122 is shifted in the direction of the optical axis and, as shown in FIG. 4B, the L1 recording layer 22 being the escape recording layer is irradiated with the beam spot. At this time, since the tracking control is carried out as little as possible, information which has been recorded on the defect area K is recorded again on the recording track of the L1 recording layer 22 in approximately the same position as the defect area K of the L0 recording layer 20 in a stacking direction. The information is recorded on the L1 recording layer 22 with lower density than on the general-purpose recording layer.

Figure 4C:
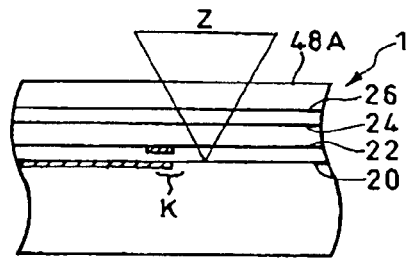

After the information corresponding to the defect area K is recorded on the L1 recording layer 22, the escape processing section 142B, as shown in FIG. 4C, further returns the focus of the beam spot to the L0 recording layer 20 with avoiding the defect area K of the L0 recording layer 20 being the general-purpose recording layer in the radial direction and restarts recording on the L0 recording layer 20. The recording is carried out with a higher recording density when compared with that on the escape recording layer.

Figure 4D:
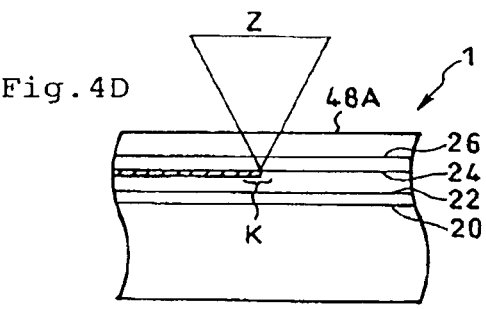

When the L2 recording layer 24 is selected as the general-purpose recording layer at which the recording of information is started, as shown in FIG. 4D, the L2 recording layer 24 is irradiated with the beam spot in order to record the information. In the L2 recording layer 24, since the groove 42 is spirally formed from the inside to the outside in the radial direction, the optical pickup 106 shifts to the outside in the radial direction with the progress of recording.

Figure 4E:
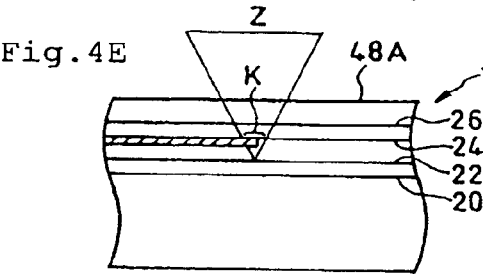
Figure 4F:
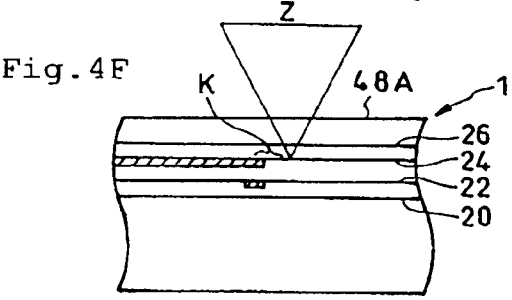

During the recording operation, when the defect inspecting section 142A detects a defect area K, the escape processing section 142B shifts the objective lens 122 in the direction of the optical axis so that, as shown in FIG. 4E, the L1 recording layer 22 being the escape recording layer is irradiated with the beam spot. At this time, since the tracking control is carried out as little as possible, information which has been recorded on the defect area K is recorded again on the recording track of the L1 recording layer 22 in approximately the same position as the defect area K of the L2 recording layer 24 in the stacking direction. After the information corresponding to the defect area K is recorded on the L1 recording layer 22, the escape processing section 142B, as shown in FIG. 4F, returns the focus of the beam spot to the L2 recording layer 24 with avoiding the defect area K of the L2 recording layer 24 in the radial direction and restarts recording on the L2 recording layer 24. Although it is not specifically illustrated herein, when the beam spot is shifted to the L1 recording layer 22, being the escape recording layer, if information has been already recorded thereon, information is recorded by avoiding such a sector.

According to the recording and reproducing apparatus 100 of the present embodiment, when a defect area is found during a recording operation on the general-purpose recording layer, recording of information can be continued by quickly moving to the escape recording layer. Thus, when compared with the case of shifting the optical pickup 106 in the radial direction in the general-purpose recording layer by tracking control, it becomes possible to very quickly complete the escape operation and hence restrain any reduction in the recording rate. In particular, in the case of the zone CLV method and the like, it is necessary to vary the rotational speed of the optical recording medium 1 when the optical pickup 106 is shifted in the radial direction, and it takes time to make the rotational speed converge to a target rotational speed. Escape in the stacking direction, as described above, makes it possible to move from the defect area K while keeping the rotational speed of the optical recording medium 1 constant.

Even if the optical pickup 106 cannot be shifted in the radial direction due to failure of the linear drive mechanism 108, the escape operation using the focus control can safely complete the information recording operation.

As a result of realizing such a quick escape operation, it becomes possible to reduce the amount of recording on the escape recording layer and quickly return to the general-purpose recording layer. This is because when returning to the general-purpose recording layer, even if there is a defect area there again, it is only necessary to shift to the escape recording layer and continue recording. As a result of this, any wasted track in the general-purpose recording layer is reduced and hence storage capacity is increased.

Furthermore, in the present embodiment, since the escape recording layer has been determined in advance, it is possible to concentrate all the information of the defect areas located in the general-purpose recording layers on the escape recording layer. Therefore, it is possible to reduce the occurrence of a situation in which information is dispersively recorded in the radial direction on the side of the general-purpose recording layers, and hence information can be recorded with high density on all the general-purpose recording layers. As a result, reading speed is also increased so that it becomes possible to smoothly reproduce moving image information.

Furthermore, in the present embodiment, the L1 recording layer 22 is selected as the escape recording layer. The L1 recording layer 22, which is the second farthest from light incident surface 38A, is irradiated with the weak laser light Z having passed through the L3 recording layer 26 and the L2 recording layer 24 and is adjacent to the L0 recording layer 20 having high reflectivity. Thus, the beam spot applied to the L1 recording layer 22 is vulnerable to interference from the surrounding area. Accordingly, by avoiding use of the L1 recording layer 22 as the general-purpose recording layer, the L1 recording layer 22 is used as the escape recording layer in the case where a defect occurs. As a result of this, it is possible to efficiently use the L0, L2, and L3 recording layers 20, 24, and 26 and strategically make full use of all the recording layers including the L1 recording layer 22. Since the recording density of the escape recording layer is set lower than that of the general-purpose recording layer, smooth recording and reading is made possible even in environment which is vulnerable to adverse effects from the surrounding area.

Since the optical recording medium 1 has multilayer structure, the storage capacity varies widely overall. For example, taking the case of the optical recording medium 1 having three or more general-purpose recording layers of 25 GB each (and therefore having four or more recording layers in total), like the present embodiment herein, if 5% of each general-purpose recording layer is a defect area, a large amount of capacity, being 3.75 GB overall, is reduced. According to the present embodiment, however, the escape recording layer compensates for such a reduction in the storage capacity so that it is possible to realize the nominal storage capacity of 75 GB. Even if the general-purpose recording layers become full before reaching the nominal storage capacity, the escape recording layer is available as a general-purpose recording layer as a last option. Thus, it is possible to enhance the reliability of the storage capacity. As a result, it is possible to obtain an optical recording medium 1 which is suitable for archival applications.

When the recording is continued by moving to the escape recording layer, it is conceivable that a defect area may be detected in the escape recording layer. In this case, since a defect area detected in the general-purpose recording layer is relatively large, it is judged that this defect affects the escape recording layer and hence the optical pickup 106 is shifted in the radial direction using the tracking control. By appropriately combining the escape operation in the stacking direction with the escape operation in the radial direction like this, optimal recording control can be realized.

The case in which a recording layer that is the nearest to the light incident surface 38A is selected as the escape recording layer will now be described. In this case, the L3 recording layer 26 is set as an escape recording layer and the remaining L0 to L2 recording layers 20, 22, and 24 are set as general-purpose recording layers The recording density of the L3 recording layer 26, being the escape recording layer, is set lower than those of the L0 to L2 recording layers 20, 22, and 24, being the general-purpose recording layers. To be more specific, the storage capacity of the L3 recording layer 26 is set at 23.3 GB and the storage capacity of the L0 to L2 recording layers 20, 22, and 24 is set at 25 GB each. Thus, the nominal storage capacity of the optical recording medium 1 becomes 75 GB, being the sum total of the general-purpose recording layers.

When the recording and reproducing apparatus 100 records information on the optical recording medium 1, a BCA area or a read-in area of the optical recording medium 1 is first read out. In the present embodiment, information such as the fact that the L0 to L2 recording layers 20, 22, and 24 are the general-purpose recording layers and the L3 recording layer 26 nearest to the light incident surface 38A is the escape recording layer is stored on the BCA area or the like of the optical recording medium 1. The recording layer setting section 142C sets the type and recording density of each recording layer according to this information.

Figure 5A:
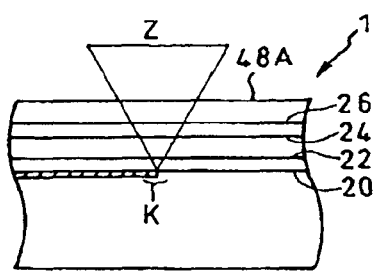
FIGS. 5A to 5F are sectional views showing another example of the information recording states of each recording layer of the optical recording medium.

When the L0 recording layer 20 is selected as the general-purpose recording layer at which recording of information is started, a trial recording operation is carried out on the L0 recording layer 20. Also, after the completion of the trial, the optical pickup 106 is positioned in a target recording track at which recording is started and preparation for the recording is completed. The encode and decode circuit 140 encodes recording information provided by the host computer into a pulse signal and inputs it to the laser controller 130. As a result of this, the laser light source 120 set at particular recording power emits predetermined laser light Z by pulse irradiation and, as shown in FIG. 5A, its beam spot is incident upon the L0 recording layer 20 in order to record the information. Since the groove 42 is spirally formed in the L0 recording layer 20 in such a manner as to run out from the inside to the outside in the radial direction, the optical pickup 106 shifts to the outside in the radial direction with the progress of the recording.

Figure 5B:
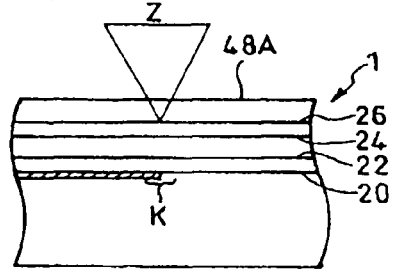

The defect inspecting section 142A of the recording and reading controller 142 judges whether or not the recording track of the L0 recording layer 20 includes a defect area on the basis of information such as a focus error and a tracking error. In this instance, when the focus error or the tracking error exceeds a predetermined permitted value or the accumulation of the errors exceeds a predetermined permitted amount, the defect inspecting section 142A judges the recording track or a sector to be a defect area K. When the defect inspecting section 142A detects the defect area K, the escape processing section 142B drives the lens drive coil 128 through the focus controller 132 so that the objective lens 122 is shifted in the direction of the optical axis and, as shown in FIG. 5B, the L3 recording layer 26, being the escape recording layer, is irradiated with the beam spot. At this time, since the tracking control is carried out as little as possible, information which has been recorded on the defect area K is recorded again on the recording track of the L3 recording layer 26 in approximately the same position as the defect area K of the L0 recording layer 20 in the stacking direction. The information is recorded on the L3 recording layer 26 with lower density than on the general-purpose recording layer.

Figure 5C:
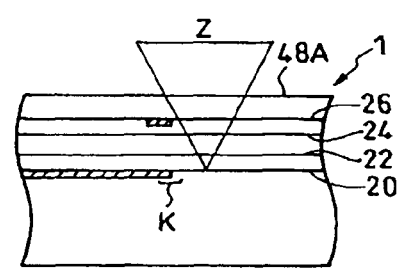

After the information corresponding to the defect area K is recorded on the L3 recording layer 26, the escape processing section 142B, as shown in FIG. 5C, further returns the focus of the beam spot to the L0 recording layer 20 with avoiding the defect area K of the L0 recording layer 20 being the general-purpose recording layer in the radial direction and restarts the recording on the L0 recording layer 20. The recording is carried out with higher recording density when compared with that on the escape recording layer.

Figure 5D:
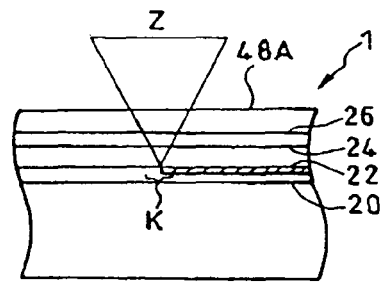

When the L1 recording layer 22 is selected as the general-purpose recording layer at which the recording of information is started, as shown in FIG. 5D, the L1 recording layer 22 is irradiated with the beam spot in order to record the information. In the L1 recording layer 22, since the groove 42 is spirally formed from the outside to the inside in the radial direction, the optical pickup 106 shifts to the inside in the radial direction with the progress of the recording.

Figure 5E:
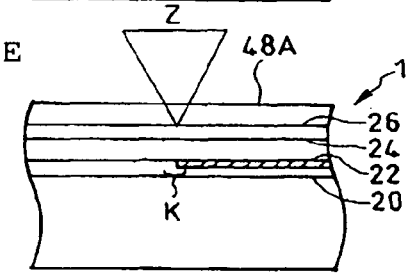
Figure 5F:
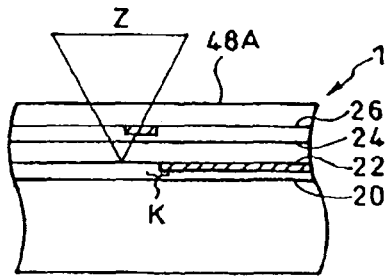

During the recording operation, when the defect inspecting section 142A detects a defect area K, the escape processing section 142B shifts the objective lens 122 in the direction of the optical axis so that, as shown in FIG. 5E, the L3 recording layer 26 being the escape recording layer is irradiated with the beam spot. At this time, since the tracking control is carried out as little as possible, information which has been recorded on the defect area K is recorded again on the recording track of the L3 recording layer 26 in approximately the same position as the defect area K of the L1 recording layer 22 in the stacking direction. After the information corresponding to the defect area K is recorded on the L3 recording layer 26, the escape processing section 142B, as shown in FIG. 5F, returns the focus of the beam spot to the L1 recording layer 22 with avoiding the defect area K of the L1 recording layer 22 in the radial direction and restarts recording on the L1 recording layer 22. Although it is not specifically illustrated herein, when the beam spot is shifted to the L3 recording layer 26 being the escape recording layer, if information has been already recorded thereon, information is recorded while avoiding such a sector.

In the present embodiment, the L3 recording layer 26 is selected as the escape recording layer. In the L3 recording layer 26 which is the nearest to the light incident surface 38A, a fingerprint, dust, and the like adhering to the light incident surface 38A tend to have effect on the beam spot. Accordingly, use of the L3 recording layer 26 as the escape recording layer instead of the general-purpose recording layer makes it possible to efficiently use the L0, L1, and L2 recording layers 20, 22, and 24. Since the recording density of the escape recording layer is set lower than that of the general-purpose recording layer, the effects of the fingerprint and the like can be restrained even if getting near the light incident surface 38A, and hence smooth recording and reading is made possible.

In these embodiments as described above, after the information of the defect area of the general-purpose recording layer is recorded on the escape recording layer, the beam spot is returned to the general-purpose recording layer. However, the present invention is not limited thereto. For example, a predetermined amount of information exceeding the defect area may be recorded on the escape recording layer. Also, in these embodiments, the defect area is judged using the feedback light of the beam spot for recording, but the present invention is not limited thereto. After the completion of recording operation on a predetermined sector or track, a laser beam with a reading power may be emitted by a read-after-write operation, and a defect area may be detected using the feedback light thereof. In this case, a tracking error or a focus error may be used. Alternatively, the error state of an actual reading signal may be used.

The foregoing embodiments have described cases in which the L1 recording layer 22 or the L3 recording layer 26 was the escape recording layer, but the present invention is not limited thereto. For example, the L0 recording layer 20 may be set as the escape recording layer. Since the L0 recording layer 20 is the farthest from the light incident surface 38A, the intensity of laser light is weak. In particular, in the case of a rewritable recording layer, there is a possibility that the L0 recording layer 20 is unsuitable for recording and reading as the general-purpose recording layer and it is preferable to use that layer as the escape recording layer in such a case. As in the case of the L1 recording layer 22, the L2 recording layer 24 may be set as the escape recording layer. Since these recording layers 22 and 24 are positioned in the middle of the plurality of recording layers, focus distance from all the other general-purpose recording layers (including L0 recording layer 20 and the L3 recording layer 26) becomes short and hence escape operation time becomes short. A single recording layer is set as the escape recording layer in these embodiments, but it is possible to provide two or more escape recording layers.

The optical recording and reproducing apparatus according to the present invention is not limited to the foregoing embodiments and various modifications can be made as a matter of course without departing from the scope of the present invention.

According to the present invention, in a recording method and the like of various kinds of multilayer optical recording media, it is possible to restrain reduction in a recording rate and storage capacity.

The entire disclosure of Japanese Patent Application No. 2006-324186 filed on Nov. 30, 2006 including specification, claims, drawings, and summary are incorporated herein by reference in its entirety.

What is claimed is:

1. An optical recording method for recording information on a multilayer optical recording medium having a plurality of recording layers by irradiating the recording layer with a beam spot, the method comprising: setting any recording layer as an escape recording layer; and when a defect area is detected while information is being recorded on another recording layer except for the escape recording layer, allowing the beam spot to move to the escape recording layer in order to continue recording the information; wherein the escape layer is only for recording information corresponding to the defect area.

2. The optical recording method according to claim 1, wherein the recording layer which is the second farthest from a light incident surface of the multilayer optical recording medium is set as the escape recording layer.

3. The optical recording method according to claim 1, wherein a recording density of the escape recording layer is set lower than at least one of other recording layers.

4. The optical recording method according to claim 1, wherein the recording layer which is the second farthest from a light incident surface of the multilayer optical recording medium is set as the escape recording layer; and a recording density of the escape recording layer is set lower than at least one of other recording layers.

5. The optical recording method according to claim 1, wherein the multilayer optical recording medium has four or more recording layers.

6. The optical recording method according to claim 1, wherein the recording layer which is the second farthest from a light incident surface of the multilayer optical recording medium is set as the escape recording layer; and the multilayer optical recording medium has four or more recording layers.

7. The optical recording method according to claim 1, wherein a recording density of the escape recording layer is set lower than at least one of other recording layers; and the multilayer optical recording medium has four or more recording layers.

8. The optical recording method according to any of claims 1, wherein after a predetermined amount of information is recorded on the escape recording layer, the beam spot is allowed to return to the recording layer being recorded on before escape and to continue recording information.

9. The optical recording method according to claim 1, wherein the recording layer which is the second farthest from a light incident surface of the multilayer optical recording medium is set as the escape recording layer; and
   after a predetermined amount of information is recorded on the escape recording layer, the beam spot is allowed to return to the recording layer being recorded on before escape and to continue recording information.

10. The optical recording method according to claim 1, wherein a recording density of the escape recording layer is set lower than at least one of other recording layers; and
   after a predetermined amount of information is recorded on the escape recording layer, the beam spot is allowed to return to the recording layer being recorded on before escape and to continue recording information.

11. The optical recording method according to claim 1, wherein the multilayer optical recording medium has four or more recording layers; and
   after a predetermined amount of information is recorded on the escape recording layer, the beam spot is allowed to return to the recording layer being recorded on before escape and to continue recording information.

12. The optical recording method according to claims 1, wherein the recording layer which is the nearest to a light incident surface of the multilayer optical recording medium is set as the escape recording layer.

13. The optical recording method according to claim 1, wherein a recording density of the escape recording layer is set lower than at least one of other recording layers; and
   the recording layer which is the nearest to a light incident surface of the multilayer optical recording medium is set as the escape recording layer.

14. The optical recording method according to claim 1, wherein the multilayer optical recording medium has four or more recording layers; and
   the recording layer which is the nearest to a light incident surface of the multilayer optical recording medium is set as the escape recording layer.

15. The optical recording method according to claim 1, wherein the recording layer which is the nearest to a light incident surface of the multilayer optical recording medium is set as the escape recording layer; and
   after a predetermined amount of information is recorded on the escape recording layer, the beam spot is allowed to return to the recording layer being recorded on before escape and to continue recording information.

16. The optical recording method according to claim 1, wherein a recording density of the escape recording layer is set lower than at least one of other recording layers;
   the recording layer which is the nearest to a light incident surface of the multilayer optical recording medium is set as the escape recording layer; and
   after a predetermined amount of information is recorded on the escape recording layer, the beam spot is allowed to return to the recording layer being recorded on before escape and to continue recording information.

17. The optical recording method according to claim 1, wherein the multilayer optical recording medium has four or more recording layers;
   a recording density of the escape recording layer is set lower than at least one of other recording layers;
   the recording layer which is the nearest to a light incident surface of the multilayer optical recording medium is set as the escape recording layer; and
   after a predetermined amount of information is recorded on the escape recording layer, the beam spot is allowed to return to the recording layer being recorded on before escape and to continue recording information.

18. An optical recording apparatus for recording information on a multilayer optical recording medium having a plurality of recording layers by irradiating the recording layer with a beam spot, the optical recording apparatus comprising: a recording layer setting section for setting any recording layer as an escape recording layer; a recording section for recording information by irradiating another recording layer except for the escape recording layer with the beam spot; an inspecting section for detecting a defect area of the recording layer using reflected light of the beam spot; and an escape processing section for changing the focus of the beam spot to the escape recording layer when the defect area is detected by the inspecting section; wherein the escape layer is only for recording information corresponding to the defect area.

19. A multilayer optical recording medium comprising: a general-purpose recording layer which allows for the information recording operation, including a recording starting process, by irradiating the general-purpose recording layer with a beam spot; and an escape recording layer which allows recording of information to be recorded on a defect area when the defect area is detected in the general-purpose recording layer during the recording operation; wherein the escape layer is only for recording information corresponding to the defect area.

* * * * *